May 20, 1941.    L. W. BUCHANAN    2,242,343
REVERSIBLE CAPACITOR MOTOR
Filed April 13, 1940
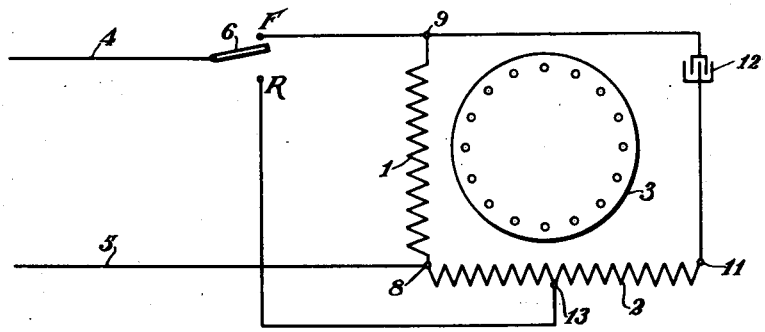
WITNESSES:    INVENTOR
               Lloyd W. Buchanan.
               BY
               ATTORNEY Patented May 20, 1941

2,242,343

UNITED STATES PATENT OFFICE 2,242,343

REVERSIBLE CAPACITOR MOTOR

Lloyd W. Buchanan, Lima, Ohio, assignor to Westinghouse Electric & Manufacturing Company, East Pittsburgh, Pa., a corporation of Pennsylvania Application April 13, 1940, Serial No. 329,481

4 Claims. (Cl. 172—278)

My invention relates to a high starting-torque, reversible, single-value capacitor-motor of a plug-reversing type utilizing a single-pole reversing-switch. More particularly, my invention relates to such a motor which is designed for high efficiency, high starting-torque, and high normal continuous-rating in the forward direction, and only a short-time or intermittent rating, relatively poor efficiency, and high starting-torque in the reverse direction.

In order to be able to plug-reverse a single-value capacitor-motor with a single-pole reversing-switch in the past, such motors have commonly been made with a two-phase winding, the two windings being identical and spaced in quadrature, a common terminal of the two windings being connected to one of the single-phase supply-line conductors, and the other terminals of the two windings being permanently connected through a capacitor and being, one or the other, joinable to the other supply-line conductor, through the respective positions of the single-pole, double-throw reversing-switch, in order to determine which of the two motor-windings will act as a main winding, and which the capacitor-winding, in order to determine the direction of the motor-torque. In order to have a high starting-torque, with such a motor, it was necessary to utilize a relatively high value of capacitance, which resulted in the motor being relatively inefficient at the normal running speeds, so that the motor had to be rated intermittently.

My present invention relates to a reversible capacitor-motor which can be rated continuously in the forward direction, but which may be plug-reversed by a single-pole switch, may have equally good, excellent starting-torques in each direction, and may be intermittently rated in the reverse direction, for only very short-time operation.

The object of my invention is to provide a novel motor and connections, for the purpose stated.

An exemplary form of embodiment of my invention is illustrated in the drawing, the single figure of which is a diagrammatic view of the motor and connections.

As shown in the drawing, the motor consists of a stator or primary member having a main winding 1 and a spatially dephased auxiliary winding 2 having more effective turns than the main winding. The motor is also provided with a squirrel-cage secondary or rotor-member, or other equivalent induction-motor rotor 3.

The motor is supplied with power from a single pair of single-phase supply-line conductors 4 and 5, through a single-pole double-throw reversing-switch 6 which is illustrated as a hinged switch-arm connected to the supply-line conductor 4, and adapted to make contact either with the forward switch-terminal F or the reverse switch-terminal R. The supply-line conductor 5 is connected to a first terminal 8 of each of the motor-windings 1 and 2. The second terminal 9 of the main winding 1 is connected to the main or forward switch-terminal F. The second terminal 11 of the auxiliary winding 2 is permanently connected to the second terminal 9 of the main winding 1 through a capacitor 12. The auxiliary winding 2 is provided with an intermediate tap 13 which is connected to the reverse switch-terminal R.

To operate the motor in a forward direction, or with a forward torque, the switch 6 is thrown so as to make contact with the forward switch-terminal F. This utilizes the main winding 1 as the main phase, and it utilizes the auxiliary winding 2 as a starting or capacitor-winding which is connected in parallel with the main winding 1, across the supply-line 4—5, through a serially connected capacitor 12. To reverse the motor, or to cause it to develop a reverse motor-torque, as in plugging, the starting-switch 6 is moved so as to make contact with the reverse switch-terminal R. This uses a part of the auxiliary winding 2, between the first terminal 8 and the intermediate tap 13, as the main winding which is directly connected across the supply-line 4—5, and it uses the entire auxiliary winding 2 as an autotransformer for stepping up the voltage which is applied to the capacitor 12 in series with the main winding 1, so that the main winding 1 is now utilized as the auxiliary or starting winding.

An advantage of my novel design and connection is that I can design the motor for running in the forward direction, with little regard to the plugging and reverse-running, or the starting. It allows me to utilize a greater proportion of the copper in the main winding 1, which reduces the copper-losses in the forward direction because the main-winding current is much greater than the auxiliary-winding current. It allows me to utilize a winding-ratio of greater than one, that is, more effective turns in the auxiliary winding 2 than in the main winding 1, so as to obtain more starting-torque, with a much smaller value of capacitance. It also allows me to vary or preselect the winding-ratio which will enable me to design the motor so that it will run with the phases balanced at full load, thereby improving the efficiency, and approaching the performance of a two-phase motor at full load, while at the same time obtaining a reasonably good starting-torque.

In the reverse-direction of operation, I can obtain the same starting torque as in the forward direction, by utilizing only part of the auxiliary winding 2 as the main or running winding in this direction of rotation. I can so design the auxiliary winding 2 that the effective turns between the first terminal 8 and the intermediate tap 13 is less than the effective turns of the main winding 1, thereby obtaining a winding-ratio of greater than one, in the reverse direction, and also increasing the voltage which is applied across the capacitor 12 and the main winding 1, which is now the auxiliary phase, to a voltage which is higher than the line-voltage. I can adjust or pre-select the position of the intermediate tap 13 so as to obtain the required starting-torque in the reverse direction. It is advisable, in this case, to make the wire of the auxiliary winding 2 larger, in the portion between the first terminal 8 and the intermediate tap 13, than in the remainder of the auxiliary winding 2.

By utilizing my present invention, I have obtained better performance, in the forward direction, while utilizing a capacitor 12 of about two-thirds of the size required in previous motors, at the same time obtaining slightly more starting-torque, in both directions, than the competitive motor.

I claim as my invention:

1. A reversible capacitor-motor having a main winding, a spatially dephased auxiliary winding having an intermediate tap, a capacitor, means for, at times, operating the motor with said main winding directly energized across a single-phase supply-line and with said auxiliary winding energized in series-circuit relation with said capacitor from said single-phase supply-line, and means for, at other times, operating said motor with a portion of the auxiliary winding directly energized across said single-phase supply-line and with the main winding utilized as a capacitor-winding energized from said single-phase supply-line in series-circuit relation to said capacitor and with said auxiliary winding utilized as an auto-transformer for stepping up the capacitor voltage.

2. A reversible capacitor-motor having a main winding, a spatially dephased auxiliary winding having more effective turns than the main winding, a pair of single-phase supply-line conductors, a double-throw reversing-switch in series with a first one of the supply-line conductors, said reversing-switch having a forward terminal and a reverse terminal, the other supply-line conductor being connected to a first terminal of both of said windings, the forward terminal of said reversing-switch being connected to the second terminal of said main winding, and a capacitor connected in series-circuit relation between the second terminal of said main winding and the second terminal of said auxiliary winding, said auxiliary winding having an intermediate tap connected to the reverse terminal of said reversing-switch.

3. The invention as defined in claim 1, characterized by the auxiliary winding having more effective turns than the main winding, and the said portion of the auxiliary winding having fewer effective turns than the main winding.

4. The invention as defined in claim 2, characterized by the portion of the auxiliary winding between the intermediate tap and the first terminal of said auxiliary winding having fewer effective turns than said main winding.

LLOYD W. BUCHANAN.